US012352362B2

(12) United States Patent
Huang (10) Patent No.: US 12,352,362 B2
(45) Date of Patent: Jul. 8, 2025

(54) BI-DIRECTIONAL INFLATING TOOL (71) Applicant: JIN DAI AUTO SUPPLIES CO., LTD., Lukang Township (TW)

(72) Inventor: Yen-Chang Huang, Lukang Township (TW)

(73) Assignee: JIN DAI AUTO SUPPLIES CO., LTD., Lukang Township (TW)

( * ) Notice: Subject to any disclaimer, the term of this patent is extended or adjusted under 35 U.S.C. 154(b) by 0 days.

(21) Appl. No.: 18/443,471

(22) Filed: Feb. 16, 2024

(65) Prior Publication Data

US 2025/0137543 A1    May 1, 2025

(30) Foreign Application Priority Data

Oct. 27, 2023   (TW) ................. 112141283

(51) Int. Cl.
*F16K 24/06*   (2006.01)
(52) U.S. Cl.
CPC ................. *F16K 24/06* (2013.01)
(58) Field of Classification Search
CPC ...................................... F16K 24/06
See application file for complete search history.

(56) References Cited

U.S. PATENT DOCUMENTS 4,532,954 A * 8/1985 Fillman ............... E03B 9/025
138/46
8,869,819 B2 * 10/2014 Huang ................... B60S 5/04
285/308

FOREIGN PATENT DOCUMENTS

TW    M441579 U    11/2012
TW    M448387 U    3/2023

* cited by examiner

*Primary Examiner* — P. Macade Nichols
(74) *Attorney, Agent, or Firm* — MUNCY, GEISSLER, OLDS & LOWE, P.C.

(57) ABSTRACT

A bi-directional inflating tool includes a handle assembly having an inner tube, an outer tube movably sleeved onto the inner tube and a sleeve pushing and pulling member with a sleeve pushing portion and a sleeve pulling portion, an adapter assembly connected to the inner tube, two nozzle connectors connected to the adapter assembly, two moving control sleeves sleeved onto the nozzle connectors respectively and each having an abutted moving portion, which are respectively pushed by the sleeve pushing portion and pulled by the sleeve pulling portion to displace axially, two detent assemblies controlled by the moving control sleeves respectively for engagement with the gas nozzle, and two valve assemblies controlling the communication of the adapter assembly with the nozzle connectors respectively for aeration. The moving control sleeves are operated separately, bringing simpleness and effort-saving, solving the time-consuming and laborious problem of the conventional bi-directional inflating tool.

10 Claims, 10 Drawing Sheets

BI-DIRECTIONAL INFLATING TOOL

BACKGROUND OF THE INVENTION

1. Field of the Invention

The present invention relates to inflating technology and more particularly, to a bi-directional inflating tool.

2. Description of the Related Art

In Taiwan Patent No. M441579 and M448387 of the applicant, two ends of the bushing are integrated, only movable at the same time, bringing relatively larger operating resistance, that is very inconvenient in usage. Besides, the adapter tube is directly integrated with the handle rod and arranged for the installation of the valve assembly, that is also inconvenient in assembly. In addition, the detent is directly pushed by the bushing, making the bushing liable to be damaged. Furthermore, there is no limiting member or portion between the bushing and the inflating fitting, making the bushing liable to axially move too much, thereby liable to be damaged by collision. Therefore, improvement is needed.

SUMMARY OF THE INVENTION

It is a primary objective of the present invention to provide a bi-directional inflating tool, which is operated to move the associated component at an end to be engaged with or released from a gas nozzle, having the effect of relatively more effort-saving, fast and convenient operation.

To attain the above primary objective, the present invention provides a bi-directional inflating tool, which includes a handle assembly, an adapter assembly, two nozzle connectors, two moving control sleeves, two detent assemblies, and two valve assemblies. The handle assembly has an inner tube, an outer tube movably sleeved onto the inner tube, and a sleeve pushing and pulling member connected to the outer tube. The sleeve pushing and pulling member has a sleeve pushing portion and a sleeve pulling portion. The adapter assembly is connected to the inner tube of the handle assembly. The adapter assembly has an inlet communicating with the inner tube, and two outlets communicating with the inlet. The two nozzle connectors are separately connected to the adapter assembly. Each of the nozzle connectors has a passageway communicating with the outlet of the adapter assembly, and two grooves recessed from the outer periphery. Each of the grooves communicates with the passageway to form a through hole. The two moving control sleeves are sleeved onto the nozzle connectors respectively. Each of the moving control sleeves has an abutted moving portion. The abutted moving portion of one of the moving control sleeves is pushed by the sleeve pushing portion to displace axially. The abutted moving portion of the other moving control sleeve is pulled by the sleeve pulling portion to displace axially. The two detent assemblies are disposed between the adapter assembly and the moving control sleeves respectively. Each of the detent assemblies includes two detent members, a spring abutting ring and a first spring. Each of the detent members has a detent portion disposed in the groove and the through hole of the nozzle connector, and two end abutting portions located at two ends of the detent portion and protruding out of the nozzle connector. Each of the end abutting portions is abutted against the moving control sleeve. The first spring is abutted against the adapter assembly. The spring abutting ring is abutted against the end abutting portions of each of the detent members and the first spring. The two valve assemblies are disposed at the outlets of the adapter assembly respectively to control the communication of the adapter assembly with each of the nozzle connectors for aeration.

It can be known from the above description that by the sleeve pushing portion pushing the abutted moving portion of one of the moving control sleeves to displace it axially, and the sleeve pulling portion pulling the abutted moving portion of the other moving control sleeve to displace it axially, the bi-directional inflating tool of the present invention provides a simplified structure for respective operation control and the effect of convenience and effort-saving.

Preferably, the adapter assembly has an adapter seat and two adapter heads. The adapter heads are connected to the adapter seat. The nozzle connectors are connected to the adapter heads.

Preferably, the adapter seat has a first connecting portion. The adapter head has a second connecting portion connected to the first connecting portion of the adapter seat.

Preferably, the adapter assembly has a protecting portion located on a side of the sleeve pulling portion of the sleeve pushing and pulling member.

Preferably, the adapter assembly has a spring abutting annular wall. The first spring is abutted against the spring abutting annular wall of the adapter assembly.

Preferably, the axis of the handle assembly and the axis of the two nozzle connectors form an included angle.

Preferably, each of the nozzle connectors has an annular circlip groove. Each of the annular circlip grooves is clipped with a stopping circlip. Each of the moving control sleeves has a circlip abutting annular portion stopped at each of the stopping circlips.

Preferably, each of the moving control sleeves has a sleeve body and a stopping washer. The stopping washer is disposed between the detent member and the sleeve body. Each of the end abutting portions is abutted against the stopping washer.

Preferably, each of the valve assemblies includes a valve stopping ring disposed between the adapter assembly and one of the nozzle connectors, and a valve inserted through the outlet of the adapter assembly to be abutted against the valve stopping ring.

Preferably, the bi-directional inflating tool further includes an elastic abutting unit abutted against each of the valve assemblies.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

First of all, it is to be mentioned that throughout this specification, including the following embodiment and claims, the directional terms are all based on the direction shown in the figures. Besides, same reference numerals used in the following embodiment and the appendix drawings designate same or similar elements or the structural features thereof.

As shown in FIGS. 1 to 11, a bi-directional inflating tool 10 according to a preferred embodiment of the present invention primarily includes a handle assembly 20, an adapter assembly 30, two nozzle connectors 40, two moving control sleeves 50, two detent assemblies 60, two valve assemblies 70, and an elastic abutting unit 80.

The handle assembly 20 has an inner tube 22, a handle sheath 23 sleeved onto an end of the inner tube 22, an outer tube 26 movably sleeved onto the inner tube 22, a push seat 27 fixedly connected to an end of the outer tube 26, and a sleeve pushing and pulling member 28 connected to the outer tube 26. Wherein, the sleeve pushing and pulling member 28 has a sleeve pushing portion 281 and a sleeve pulling portion 282.

The adapter assembly 30 has an adapter seat 30A and two adapter heads 30B. The adapter heads 30B are connected to two ends of the adapter seat 30A respectively.

Figures 6, 7:
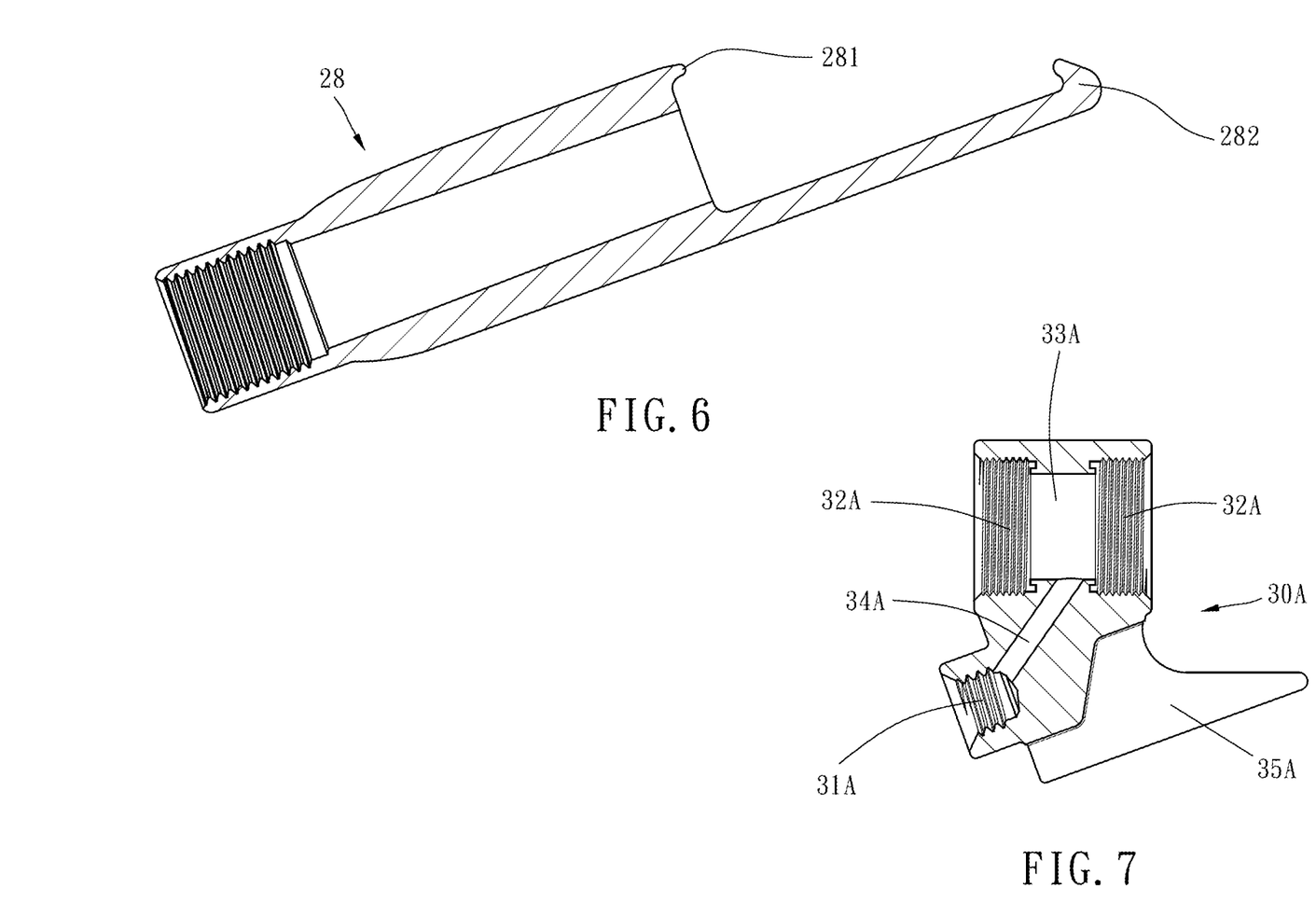
FIG. 6 is a planar sectional view of an outer tube of a preferred embodiment of the present invention.
FIG. 7 is a planar sectional view of an adapter seat of a preferred embodiment of the present invention.

The adapter seat 30A has an inner tube connecting hole 31A, two first connecting portions 32A, a communicating hole 33A, an inlet 34A, and two protecting portions 35A. Wherein, the inner tube connecting hole 31A is connected with the inner tube 22 of the handle assembly 20. The two first connecting portions 32A are located at two ends respectively. The communicating hole 33A communicates with the two first connecting portions 32A. The inlet 34A communicates with the inner tube connecting hole 31A and the communicating hole 33A.

Figure 8:
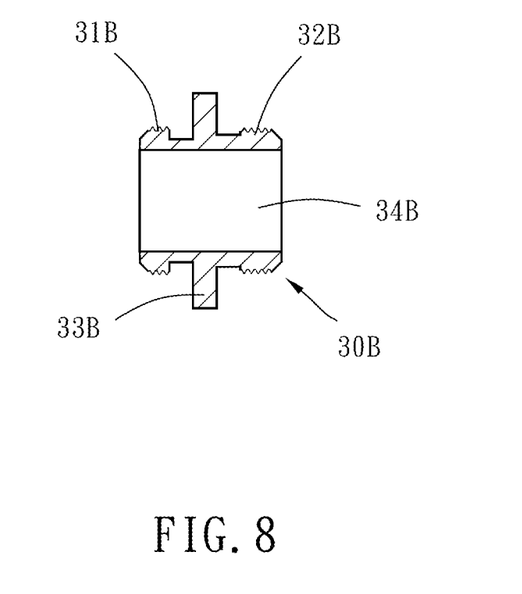
FIG. 8 is a planar sectional view of an adapter head of a preferred embodiment of the present invention.

Each of the adapter heads 30B has a second connecting portion 31B, a first combining portion 32B, a spring abutting annular wall 33B, and an outlet 34B. Wherein, the second connecting portion 31B is screwed into the first connecting portion 32A. The spring abutting annular wall 33B is connected to the second connecting portion 31B. The first combining portion 32B is connected to the spring abutting annular wall 33B. The outlet 34B communicates with the inlet 34A.

Figure 9:
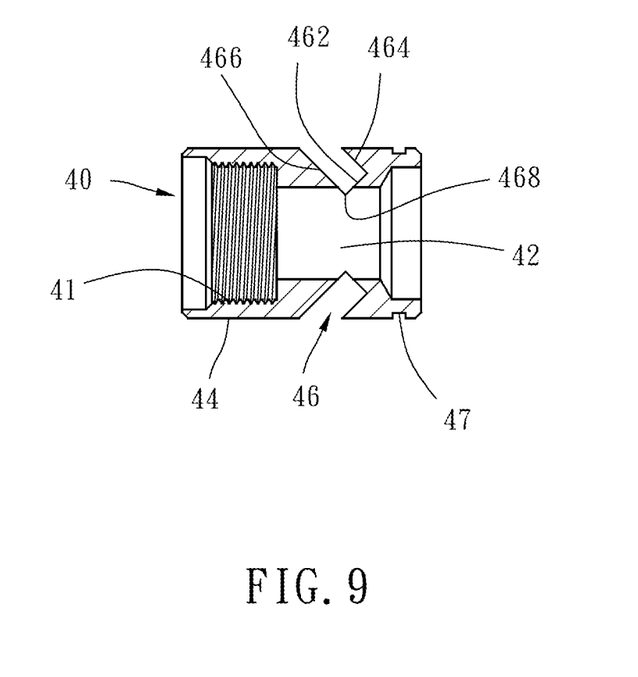
FIG. 9 is a planar sectional view of a nozzle connector of a preferred embodiment of the present invention.

The two nozzle connectors 40 are respectively screwed onto the first combining portions 32B of the adapter assembly 30 by a second combining portion 41. Each of the nozzle connectors 40 is shaped as a circular pipe. Each of the nozzle connectors 40 has a passageway 42 communicating with the outlet 34B of the adapter assembly 30, and an outer periphery 44 shaped as a cylindrical surface. Besides, each of the nozzle connectors 40 further has two grooves 46 recessed from the outer periphery 44. Each of the grooves 46 has a bottom surface 462, and two side surfaces 464 and 466 inclinedly extending from the bottom surface 462 in the direction of approaching the adapter assembly 30. Wherein, a through hole 468 is provided at the intersection of the side surface 466, which is located relatively closer to the adapter assembly 30, and the bottom surface 462. The through hole 468 communicates with the passageway 42.

Each of the nozzle connectors 40 still has an annular circlip groove 47. Each of the annular circlip grooves 47 is clipped with a stopping circlip C1.

Figure 10:
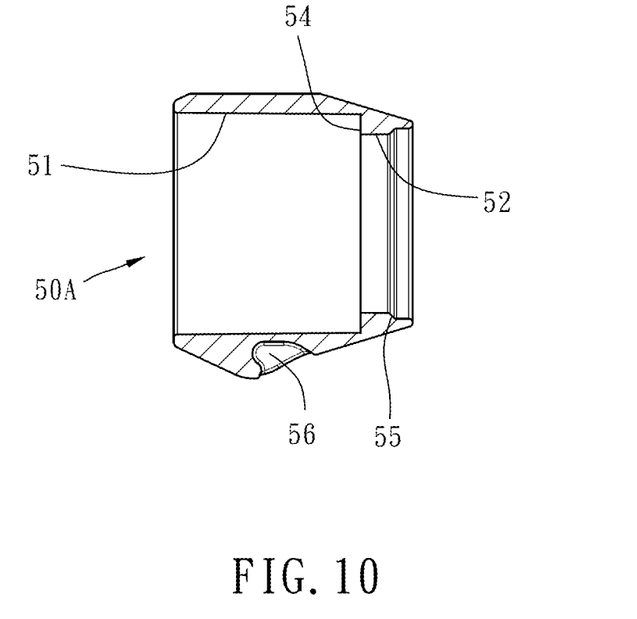
FIG. 10 is a planar sectional view of a sleeve body of a moving control sleeve of a preferred embodiment of the present invention.

The moving control sleeves 50 are sleeved onto the nozzle connectors 40 respectively. Each of the moving control sleeves 50 in this embodiment is composed of a sleeve body 50A and a stopping washer 50B. Each of the sleeve bodies 50A has a detent sleeving hole 51, a nozzle sleeving hole 52, a detent facing portion 54, a circlip abutting annular portion 55, and an abutted moving portion 56. Wherein, the nozzle sleeving hole 52 communicates with the detent sleeving hole 51 to be sleeved onto the nozzle connector 40. The detent facing portion 54 is located in the detent sleeving hole 51. The circlip abutting annular portion 55 is located on a side of the detent sleeving hole 51 for being stopped at each of the stopping circlips C1. The abutted moving portion 56 is a recess located on the outside. Besides, the axis of the handle assembly 20 and the axis of the two nozzle connectors 40 form an included angle A1, which is approximately 20 degrees in this embodiment, but the present invention is unlimited thereto.

Figure 1:
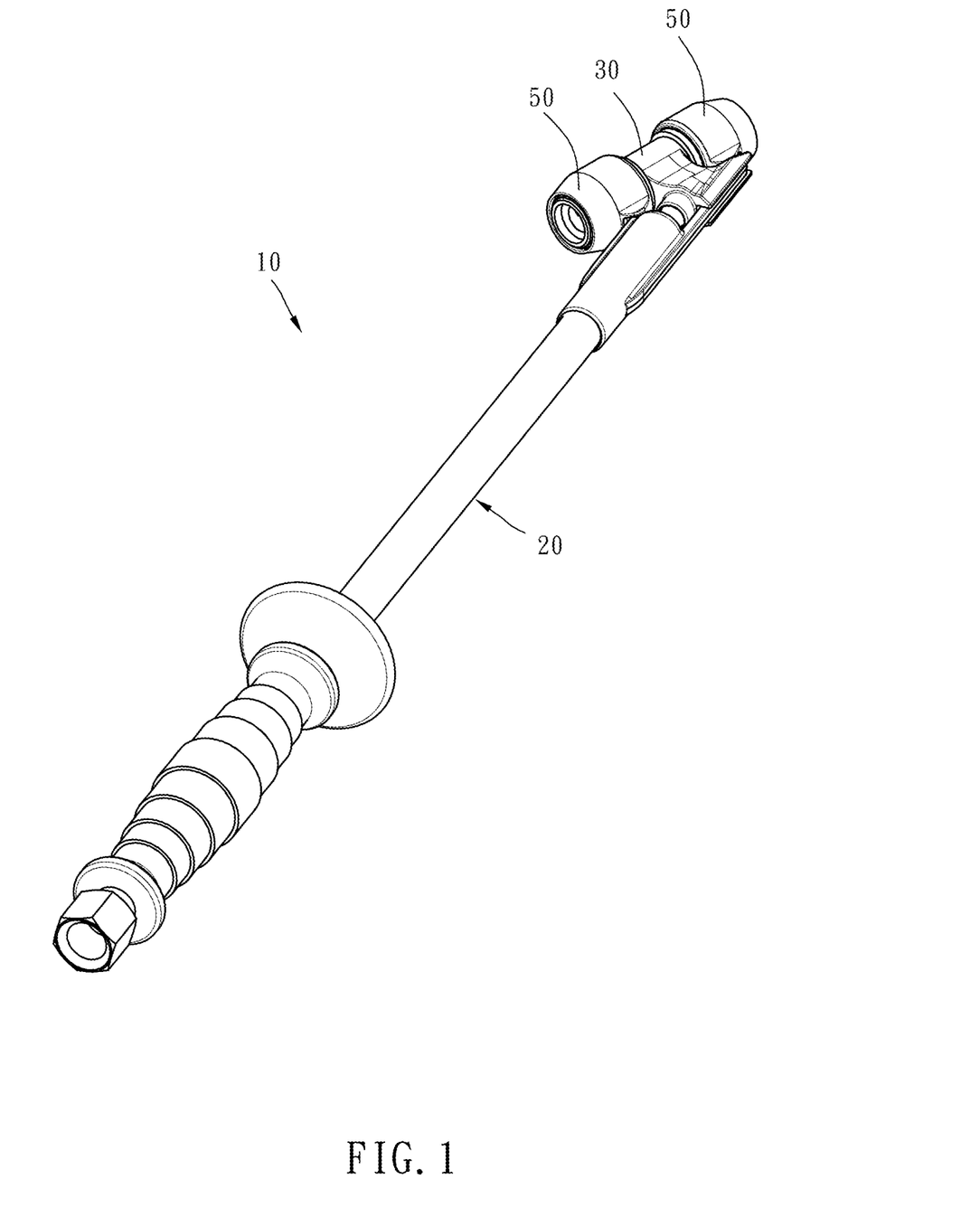
FIG. 1 is an assembled perspective view of a preferred embodiment of the present invention.
Figure 2:
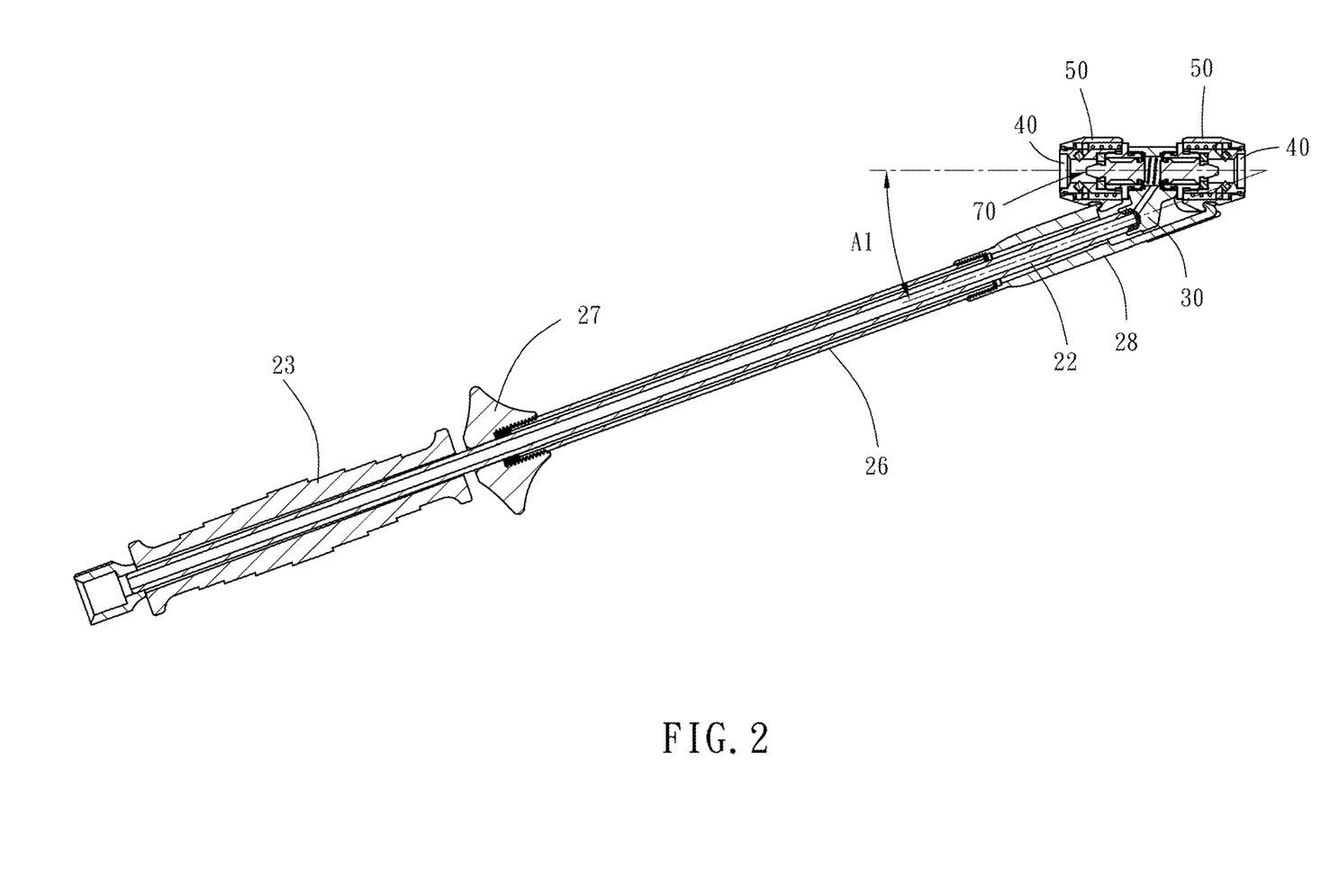
FIG. 2 is an assembled sectional view of a preferred embodiment of the present invention.
Figure 3:
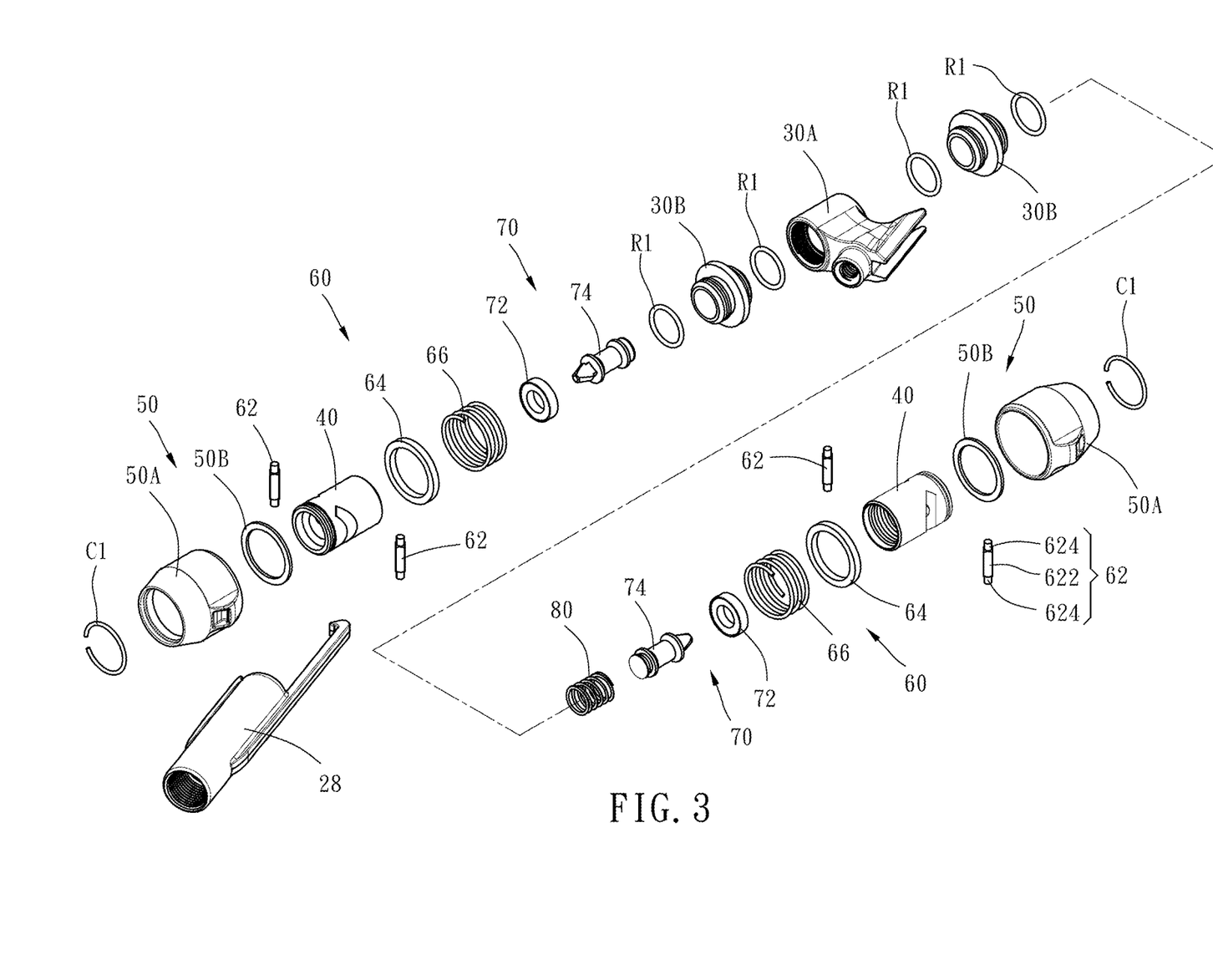
FIG. 3 is an exploded perspective view of a preferred embodiment of the present invention in a direction.
Figure 4:
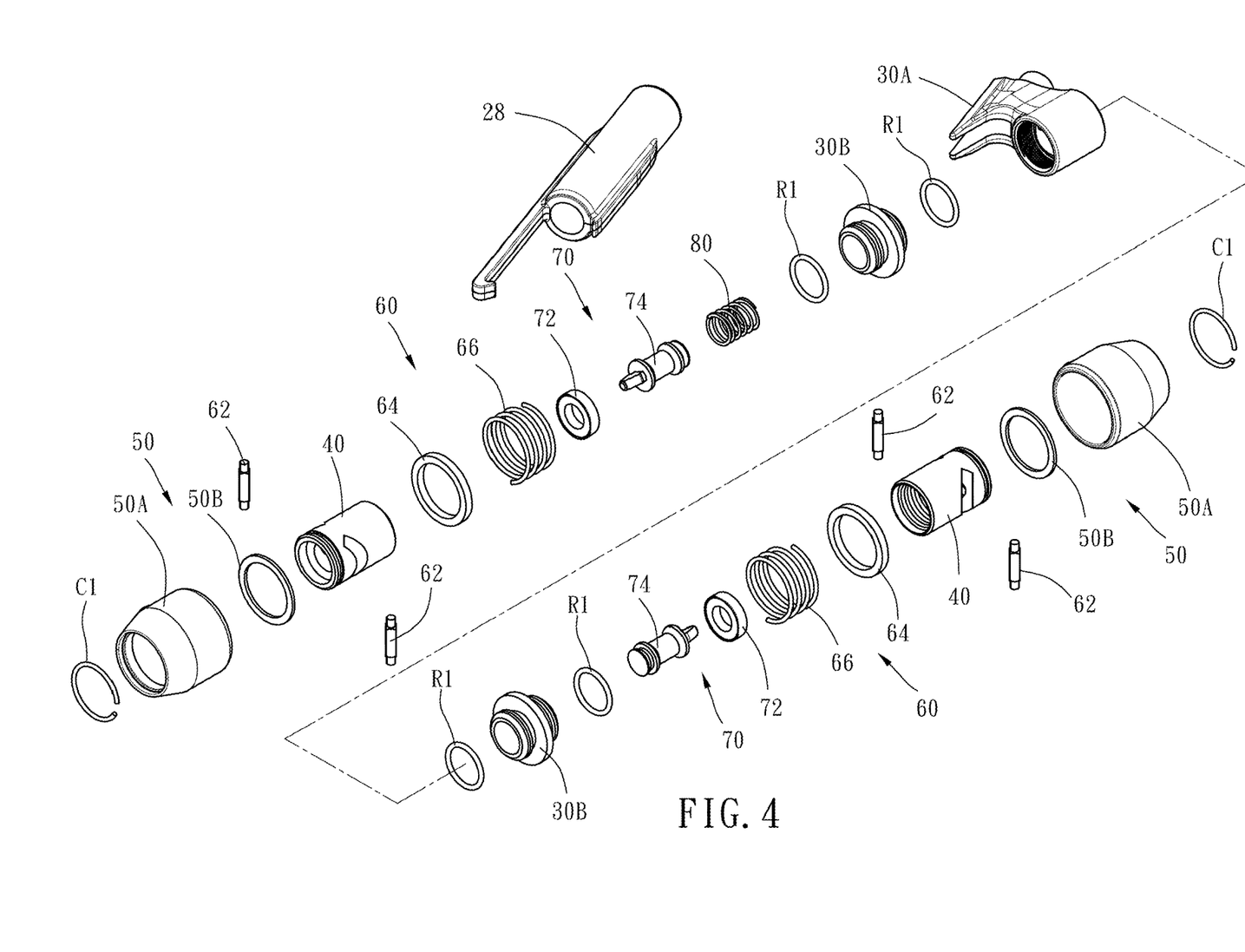
FIG. 4 is an exploded perspective view of a preferred embodiment of the present invention in another direction.
Figure 5:
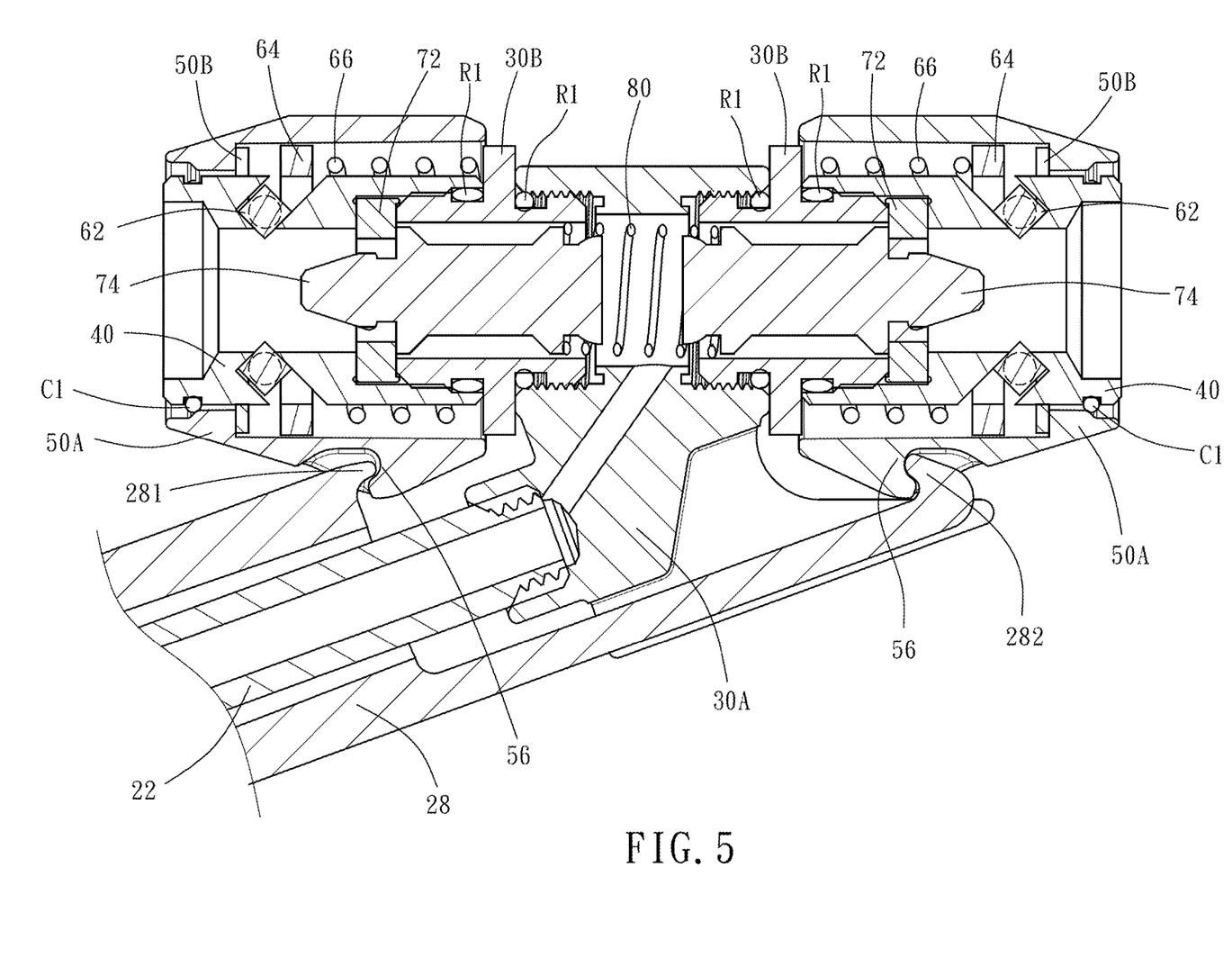
FIG. 5 is a partial assembled sectional view of a preferred embodiment of the present invention.

The two detent assemblies 60 are sleeved onto the nozzle connectors 40 respectively, and respectively located between the detent facing portions 54 of the moving control sleeves 50 and the adapter assembly 30. Each of the detent assemblies 60 includes two detent members 62, a spring abutting ring 64, and a first spring 66.

Each of the detent members 62 has a detent portion 622 disposed in the groove 46 of the nozzle connector 40, and two end abutting portions 624 located at two ends of the detent portion 622 and protruding out of the nozzle connector 40. In this embodiment, the detent portion 622 and the end abutting portion 624 of each of the detent members 62 are shaped as a quadrangular column and a cylinder respectively. Three surfaces of the detent portion 622 are in surface contact with the bottom surface 462 and the side surface 464 of the groove 46 respectively. The detent portion 622 is located at the intersection of two of the surfaces. Each spring abutting ring 64 and first spring 66 are disposed between the end abutting portions 624 of the two detent members 62 and the adapter assembly 30. Each of the end abutting portions 624 is abutted against the stopping washer 50B of the moving control sleeve 50. Two ends of the first spring 66 are abutted against the spring abutting ring 64 and the adapter assembly 30 respectively. The stopping washer 50B is disposed between the detent member 62 and the sleeve body 50A. More specifically speaking, the first spring 66 is abutted against the spring abutting annular wall 33B of the adapter head 30B of the adapter assembly 30.

Figure 11:
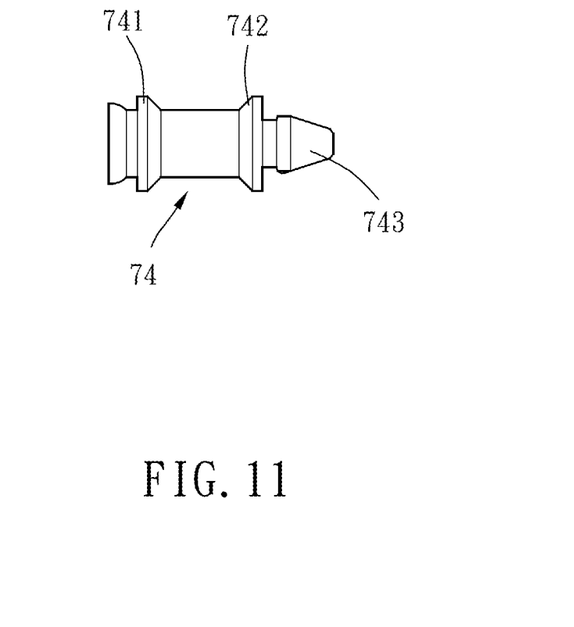
FIG. 11 is a planar sectional view of a valve of a preferred embodiment of the present invention.

The two valve assemblies 70 are disposed in the outlets 34B of the adapter assembly 30 respectively. Each of the valve assemblies 70 includes a valve stopping ring 72 disposed between the outlet 34B and one of the nozzle connectors 40, and a valve 74 inserted through the outlet 34B of the adapter assembly 30 to be abutted against the valve stopping ring 72. The valve assemblies 70 control the communication of the two outlets 34B with the nozzle connectors 40 respectively. The valve 74 sequentially has a valve bottom 741, a valve body 742 and a valve head 743. The valve body 742 can close fit the valve stopping ring 72. The valve head 743 can be pressed against the needle of a gas nozzle.

The elastic abutting unit 80 in this embodiment is a second spring abutted against the valve bottoms 741 of the valve assemblies 70 respectively, so as to make the valve assemblies 70 control the communication of the two outlets 34B with the nozzle connectors 40 respectively.

When the above-described bi-directional inflating tool 10 is in use, the inner tube 22 is adapted to receive gas provided by a pressure gas source (not shown). The gas will flow to the adapter assembly 30. As long as the user sleeves the passageway 42 of one of the nozzle connectors 40 onto the gas nozzle of a tire (not shown) and pushes the nozzle connector 40 toward the tire, the gas nozzle will push and open the valve 74 to make the adapter assembly 30 communicate with the passageway 42 of the nozzle connector 40, so that the gas in the adapter assembly 30 enters the gas nozzle through the passageway 42. Meanwhile, the detent portions 622 of the two detent members 62 disposed on the nozzle connector 40 are engaged with the external threads of the gas nozzle to tightly clamp the gas nozzle.

Figure 12:
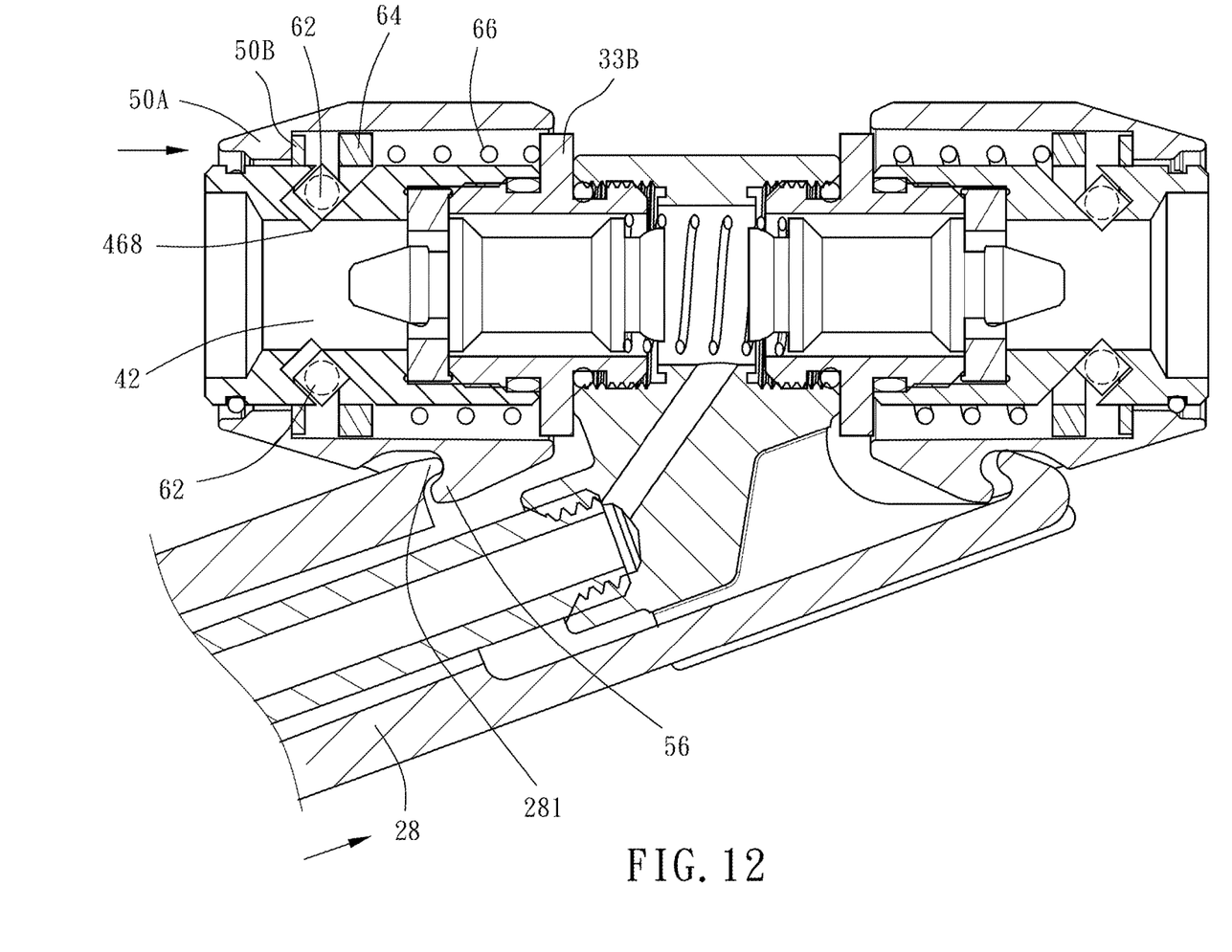
FIG. 12 is similar to FIG. 5, presenting a pushed movement status.
Figure 13:
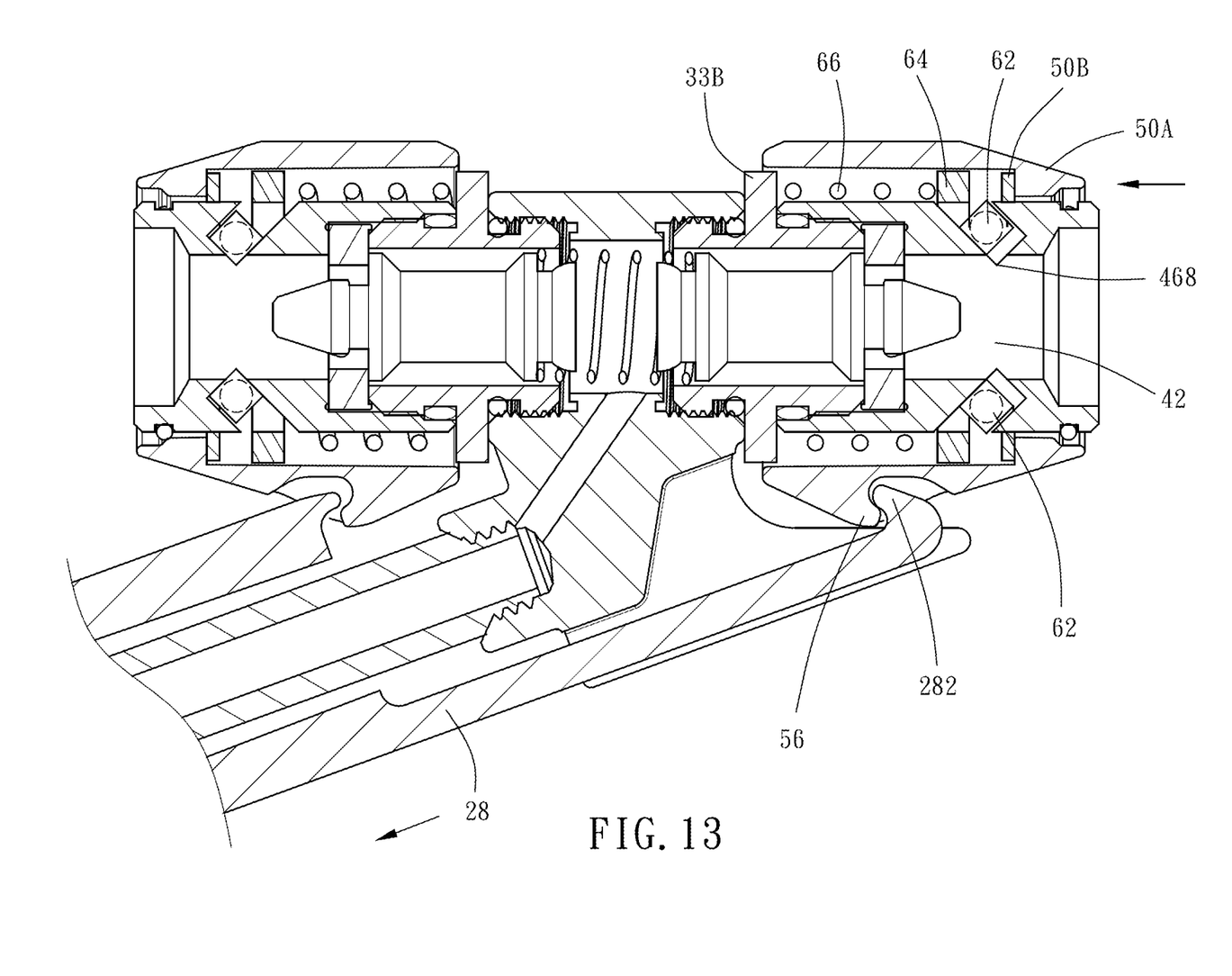
FIG. 13 is similar to FIG. 5, presenting a pulled movement status.

The user can push the push seat 27 of the handle assembly 20 toward the adapter assembly 30 (as shown in FIG. 12) or toward the handle sheath 23 (as shown in FIG. 13) to drive the respective moving control sleeves 50 to move in different directions. The detent facing portion 54 of the moving control sleeve 50 pushes the stopping washer 50B to move. The stopping washer 50B pushes the end abutting portions 624 of the detent members 62 and compresses the first spring 66 through the spring abutting ring 64, so that the pushed detent members 62 move outwardly along the side surfaces 464 of the grooves 46 to make the detent portions 622 thereof leave the through holes 468 of the nozzle connector 40, thereby not engaged with the gas nozzle. At this time, the inflating tool 10 can be separated from the gas nozzle (or inserted thereinto or moved). Then, as long as the user no longer pushes or pulls the push seat 27 or the outer tube 26, the elastic restoring force provided by the first spring 66 will restore the inflating tool 10 to the status as shown in FIG. 5.

Therefore, it is suitable for big trucks with two opposite gas nozzles on two tires beside each other, for which the respective operation is convenient, but the present invention is unlimited thereto.

It is operated to drive only one of the moving control sleeves 50 to move only the detent assembly 60 and the valve assembly 70 on the same side, and can be still engaged with or released from the gas nozzle, so it has the effect of relatively more effort-saving, fast and convenient operation, thereby attaining the objective of the present invention.

Besides, the two stopping washers 50B can prevent the detent members 62 from damaging the moving control sleeves 50.

In addition, the adapter assembly 30 being composed of the adapter seat 30A and the adapter heads 30B facilitates the adapter assembly 30 to attain the required structure in coordination with the detent assembly 60 and the valve assembly 70.

Except for the above embodiment, the present invention can be implemented with the following variations.

For example, the sleeve pushing portion 281 and the sleeve pulling portion 282 of the sleeve pushing and pulling member 28 are unlimited to the above-described hook connection or pushing, but may be a pivotably connection structure, or may be linkage connection structure.

Alternatively, the protecting portion 35A is unlimited to the above-described amount of two, but there may be one protecting portion 35A located on one of the side surfaces or the top surface, or there may be one protecting portion 35A located on the side surfaces and the top surface to surround.

Alternatively, the spring abutting ring 64 of each of the detent assemblies 60 may be formed integrally or connected to an end of the first spring 66.

Alternatively, the elastic abutting unit 80 may be varied into two second springs abutted against the adapter assembly 30 and the valve assemblies 70 respectively. Alternatively, there may be no elastic abutting unit 80.

In conclusion, the effect provided by the bi-directional inflating tool 10 of the present invention certainly attains the objective of the present invention.

What is claimed is:

1. A bi-directional inflating tool comprising:
 a handle assembly having an inner tube, an outer tube movably sleeved onto the inner tube, and a sleeve pushing and pulling member connected to the outer tube, the sleeve pushing and pulling member having a sleeve pushing portion and a sleeve pulling portion;
 an adapter assembly connected to the inner tube of the handle assembly, the adapter assembly having an inlet communicating with the inner tube, and two outlets communicating with the inlet;
 two nozzle connectors separately connected to the adapter assembly, each of the nozzle connectors having a passageway communicating with the outlet of the adapter assembly, and two grooves recessed from an outer periphery, each of the grooves communicating with the passageway to form a through hole;
 two moving control sleeves sleeved onto the nozzle connectors respectively, each of the moving control sleeves having an abutted moving portion, the abutted moving portion of one of the moving control sleeves being pushed by the sleeve pushing portion to displace axially, the abutted moving portion of the other moving control sleeve being pulled by the sleeve pulling portion to displace axially;
 two detent assemblies disposed between the adapter assembly and the moving control sleeves respectively, each of the detent assemblies comprising two detent members, a spring abutting ring and a first spring, each of the detent members having a detent portion disposed in the groove and the through hole of the nozzle connector, and two end abutting portions located at two ends of the detent portion and protruding out of the nozzle connector, each of the end abutting portions being abutted against the moving control sleeve, the first spring being abutted against the adapter assembly, the spring abutting ring being abutted against the end abutting portions of each of the detent members and the first spring; and
 two valve assemblies disposed at the outlets of the adapter assembly respectively to control communication of the adapter assembly with each of the nozzle connectors for aeration.

2. The bi-directional inflating tool as claimed in claim 1, wherein the adapter assembly has an adapter seat and two adapter heads; the adapter heads are connected to the adapter seat; the nozzle connectors are connected to the adapter heads.

3. The bi-directional inflating tool as claimed in claim 2, wherein the adapter seat has a first connecting portion; the adapter head has a second connecting portion connected to the first connecting portion of the adapter seat.

4. The bi-directional inflating tool as claimed in claim 1, wherein the adapter assembly has a protecting portion located on a side of the sleeve pulling portion of the sleeve pushing and pulling member.

5. The bi-directional inflating tool as claimed in claim 1, wherein the adapter assembly has a spring abutting annular wall; the first spring is abutted against the spring abutting annular wall of the adapter assembly.

6. The bi-directional inflating tool as claimed in claim 1, wherein an axis of the handle assembly and an axis of the two nozzle connectors form an included angle.

7. The bi-directional inflating tool as claimed in claim 1, wherein each of the nozzle connectors has an annular circlip groove; each of the annular circlip grooves is clipped with a stopping circlip; each of the moving control sleeves has a circlip abutting annular portion stopped at each of the stopping circlips.

8. The bi-directional inflating tool as claimed in claim 1, wherein each of the moving control sleeves has a sleeve body and a stopping washer; the stopping washer is disposed between the detent member and the sleeve body; each of the end abutting portions is abutted against the stopping washer.

9. The bi-directional inflating tool as claimed in claim 1, wherein each of the valve assemblies comprises a valve stopping ring disposed between the adapter assembly and a said nozzle connector, and a valve inserted through the outlet of the adapter assembly to be abutted against the valve stopping ring.

10. The bi-directional inflating tool as claimed in claim 1, wherein the bi-directional inflating tool further comprises an elastic abutting unit abutted against each of the valve assemblies.

\* \* \* \* \*